United States Patent [19]
Bitzer et al.

[11] Patent Number: 5,457,362
[45] Date of Patent: Oct. 10, 1995

[54] PROCESS AND DEVICE FOR CONTROLLING THE FREQUENCY OF A TRAVELING WAVE MOTOR

[75] Inventors: Rainer Bitzer, Weil der Stadt; Claus Kramer, Besigheim; Arnold Winter, Filderstadt, all of Germany

[73] Assignee: Robert Bosch GmbH, Stuttgart, Germany

[21] Appl. No.: 211,963

[22] PCT Filed: Sep. 4, 1992

[86] PCT No.: PCT/DE92/00749

§ 371 Date: Apr. 21, 1994

§ 102(e) Date: Apr. 21, 1994

[87] PCT Pub. No.: WO93/08607

PCT Pub. Date: Apr. 29, 1993

[30] Foreign Application Priority Data

Oct. 22, 1991 [DE] Germany .................. 41 34 781.1

[51] Int. Cl.⁶ .................................................. H01L 41/08
[52] U.S. Cl. ............................................ 318/116; 310/316
[58] Field of Search .................................. 310/323, 328, 310/316, 317; 318/116

[56] References Cited

U.S. PATENT DOCUMENTS

| | | | |
|---|---|---|---|
| 4,727,276 | 2/1988 | Izukawa et al. | 310/316 |
| 4,888,514 | 12/1989 | Takahashi et al. | 310/316 |
| 4,926,084 | 5/1990 | Furutsu et al. | 310/316 |
| 4,952,834 | 8/1990 | Okada | 310/316 |
| 5,101,144 | 3/1992 | Hirotomi | 318/116 |
| 5,146,143 | 9/1992 | Furutsu | 310/316 X |
| 5,229,678 | 7/1993 | Miyazawa | 310/323 |
| 5,276,376 | 1/1994 | Puskas | 310/317 |

FOREIGN PATENT DOCUMENTS

| | | |
|---|---|---|
| 0366496 | 5/1990 | European Pat. Off. . |
| 3835090 | 4/1989 | Germany . |
| 62-02869 | 1/1987 | Japan . |
| 1321876 | 12/1989 | Japan . |
| 91/08594 | 6/1991 | WIPO . |

OTHER PUBLICATIONS

Schadebrod et al.: "Der Piezo–Wanderwellenmotor–Antriebs–element ind er Aktorik, Neues Wirkungsprinzip" (The Piezo Traveling Wave Motor–Driving Element in Actuation; A new Performance Principle), Industrie–Anzeiger Jun. 1991, pp. 32–34.

Yukihiko Ise: "Traveling Wave Ultrasonic Motors Offer High Conversion Efficiency", JEE, Jun. 1986, pp. 66–70.

Schadebrod et al: "The Piezo Traveling Wave Motor—A New Element in Actuation". Control Engineering/May 1990, pp. 10, 14, 16 and 18.

*Primary Examiner*—Mark O. Budd
*Attorney, Agent, or Firm*—Spencer, Frank & Schneider

[57] ABSTRACT

In a method for controlling the frequency of a traveling wave motor, in which an actual value proportional to the actual frequency of the excitation alternating voltage of the traveling wave motor (10) is obtained from the amplitude of an alternating voltage (sense voltage) tapped from the amplitude of a stator (11) of the traveling wave motor (10). The actual value is compared with the desired frequency of the proportional desired value and the excitation frequency is corrected with the deviation which was subjected to suitable control algorithm. In order to stop the traveling wave motor (10) at a stable operating point at maximal performance, the desired value is derived from the amplitude modulation of the sense voltage. This desired value is obtained in a superimposed control loop in which the sense voltage is demodulated, rectified and compared with a predetermined desired amplitude modulation value. The comparative difference is fed to a controller (21), whose control value taken at its output, represents the desired value (1).

11 Claims, 1 Drawing Sheet

PROCESS AND DEVICE FOR CONTROLLING THE FREQUENCY OF A TRAVELING WAVE MOTOR

BACKGROUND OF THE INVENTION

The invention relates to a method and a device for controlling the frequency of a travelling wave motor of the type having a disk-shaped stator with a piezoring fastened to the stator and a disk-shaped rotor which is pressed to contact the piezoring via a frictional layer, with the piezoring carrying two groups of mutually alternating piezoelectric zones which are excited by respective alternating voltages phase-shifted by 90° in relation to one another, and wherein an actual value proportional to the actual frequency of the motor is obtained from the amplitude of an alternating voltage (sense voltage) tapped from the stator of the traveling wave motor, is compared with a desired value proportional to the desired frequency, and the resulting deviation value is used to correct the frequency of the excitation alternating voltage of the motor after being subjected to a suitable control algorithm.

Travelling wave motors, also referred to as ultrasonic motors, are known, and their construction, their function, and their preferred possible applications are described, for example, in the following literature:

Schadebrod and Salomon, "Der Piezo-Wanderwellenmotor—Antriebselement in der Aktorik, Neues Wirkungsprinzip," (The Piezo Traveling Wave Motor—Driving Element in Actuation; A New Performance Principle), Industrie-Anzeiger 6/1991, Pages 32–34;

Schadebrod and Salomon, "The Piezo Traveling Wave Motor—A New Element in Actuation," Control Engineering/May 1990, Pages 10–18.

Yukihiko Ise, "Traveling Wave Ultrasonic Motors Offer High Conversion Efficiency, JEE, June 1986, Pages 66–70.

In order to control the traveling wave motor, a zone of the piezoring in the stator is contacted a sensor output. This zone gives off an alternating voltage, the so-called sense voltage or "sense," which is used to control the motor The object of the frequency-control method for the known traveling wave motor of the type mentioned above is to keep the operating point of the traveling wave motor within the resonance range of its characteristic curve, since it affords maximal performance in this operating range.

In a known method of this type, the desired value of the frequency of the excitation voltage is changed manually by means of a desired value transmitter until the user realizes on the basis of the change in the speed and by the sounds emitted by the traveling wave motor that the latter is within the resonance range. The desired value is then left unchanged during operation. This adjustment process must be performed for each traveling wave motor due to the spread between units and repeated each time the traveling wave motor is used again, since the operating point is displaced due to internal processes in the traveling wave motor while the traveling wave motor is at rest, although the desired value was not changed. Nor does the optimal operating point during operation lie at a constant frequency, which is additionally subjected to the spread between units, but instead is subjected to the drifting of a plurality of parameters so that the known frequency control using a constant predetermined desired value does not result in a stable operating point within the maximum performance of the traveling wave motor.

SUMMARY ADVANTAGES OF THE INVENTION

According to the present invention, there is provided a method for controlling the frequency of a traveling wave motor having a disk-shaped stator with a piezoring fastened to the stator, and a disk-shaped rotor which is pressed to contact the piezoring via a frictional layer, with the piezoring carrying two groups of mutually alternating piezoelectric zones which are excited by respective alternating voltages phase-shifted by 90° in relation to one another, wherein an actual value proportional to the actual frequency of the motor is obtained from the amplitude of an alternating voltage (sense voltage) tapped from a stator of the traveling wave motor and is compared with a desired value proportional to the desired frequency of the motor, and the deviation is subjected to a suitable control algorithm which is used to correct the frequency of the excitation alternating voltage of the motor, and wherein the desired frequency value is derived from the amplitude modulation of the sense voltage.

The basic method according to the invention described above, has the advantage and the prior art methods that the desired excitation frequency is not rigidly set, but corresponds to the respective operating condition of the traveling wave motor. The amplitude modulation of the sense signal used in this case is the result of oscillations by the traveling wave motor when it exceeds the resonance point and when it operates in the immediate vicinity of this resonance point. According to the invention, this amplitude modulation is used to control the desired excitation frequency such that the traveling wave motor always operates at the operating point of maximum performance.

According to a preferred embodiment of the method according to the invention, the amplitude modulated sense signal, in this case, is demodulated, rectified and compared with a predetermined limiting value, which corresponds to a desired amplitude modulation value. The comparative difference is fed to a controller from which the control value, taken at its output, is used as the desired value. This results in a superimposed frequency control loop, which produces a control signal that is used in place of the manually controlled desired frequency in the known frequency control loop. The advantage of this superimposed frequency is that the traveling wave motor, despite the most variable influence factors and their drifts, is always still adjusted to the optimum operating point within the operating region.

Due to the method according to the invention, the traveling wave motor, even despite the spread between units, is adjusted to this operating point of maximal performance. Pairing and adjustment problems are avoided in the same manner. An adjustment process during the operation of the traveling wave motor is superfluous and is performed independently by means of the superimposed frequency control loop.

A suitable control device according to the invention for implementing the frequency control method according to the invention which includes a voltage-controlled oscillator supplying the excitation voltage for the traveling wave motor, with the oscillator frequency being adjustable by means of a direct control voltage which is fed to the control input of the oscillator and is a desired direct voltage, a first controller whose output is connected to the input of the oscillator for supplying the desired direct voltage and to whose input is supplied the deviation obtained from the actual direct voltage and the desired direct voltage derived from the amplitude of the sense voltage in a first difference former, an amplitude demodulator to which the motor sense voltage is fed and whose output is connected to a rectifier stage supplying a direct voltage proportional to the modulation stroke, and a second difference former whose inputs are supplied with the differential voltage of the rectifier stage and with a predetermined voltage corresponding to the desired amplitude modulation value and whose output voltage is fed to the input of a second controller whose output signal represents the desired direct voltage supplied to the first difference former.

BRIEF DESCRIPTION OF THE DRAWINGS

The method according to the invention is further described in the specification below and illustrated by way of an embodiment of a frequency control device shown in the drawing wherein.

DETAILED DESCRIPTION OF THE PREFERRED EMBODIMENT

Figure 1:
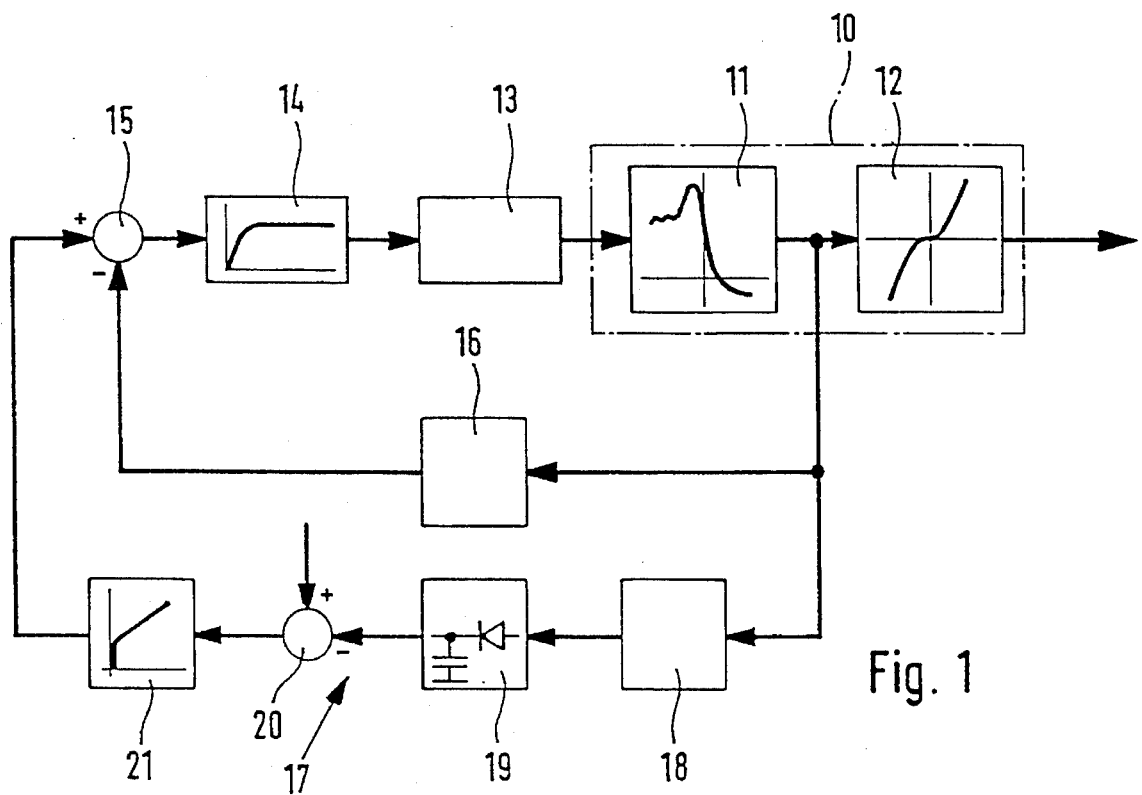
FIG. 1 is an embodiment of block diagram of a control device according to the invention for the frequency control according to the invention of a traveling wave motor.
Figure 2:
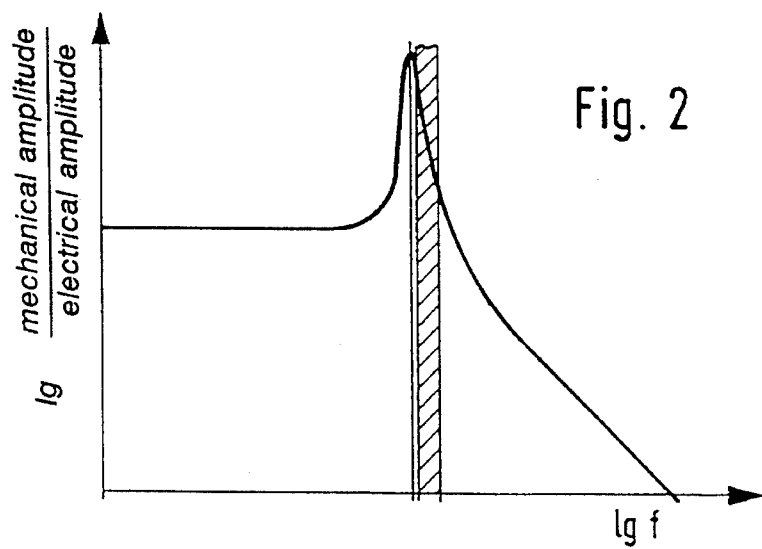
FIG. 2 is a diagram of the transmission characteristic line of the stator in the traveling wave motor.

FIG. 1 is a block diagram of the control device of a traveling wave motor, which is denoted in its entirety by reference numeral 10. The stator 11 and the rotor 12 of the traveling wave motor is schematically shown, with each block representing the stator 11 and the rotor 12 showing the respective transmission behavior as a characteristic line. The construction and the operation of the traveling wave motor 10 are described in detail in the literature cited earlier. In summary, the traveling wave motor 10 comprises a disk-shaped stator 11, including a piezo ring which is fastened to it, and a disk-shaped rotor 12 which is pressed into contact with the piezo ring by means of a frictional layer. The non-illustrated piezo ring carriers two groups of alternating, polarized piezoelectric zones, which are excited by means of alternating voltages which are phase-shifted by 90° in relation to one another. On the piezoring of the stator disk 11, a zone is contacted as a sensor output. At this zone, an alternating voltage, the so-called sense voltage or "sense" is tapped. The behavior of the stator 11 is shown in FIG. 2 which is a logarithmic illustration of the amplitude response (ratio of the mechanical amplitude to the electric amplitude) over the excitation frequency of stator 11. The rise at resonance is clearly seen. The traveling wave motor 10 is now operated at an excitation frequency such that its operating range lies in the resonance portion of the characteristic line. This operating range or region is indicated by hatching in FIG. 2 within this operating range is an operation point in which the traveling wave motor 10 reaches its maximum performance. It is the object of the frequency control method described below to ensure a stable operating point of the traveling wave motor at maximum performance.

To accomplish this objective, an actual value proportional to the actual frequency of the excitation voltage is obtained and compared with a desired value proportional to the desired frequency. The deviation between the desired value and the actual value is subjected to a suitable control algorithm and used to correct the excitation frequency. Tests have shown that due to drifting of a plurality of values of the traveling wave motor 10, its operating point in the operating range cannot be kept stable. For this reason, the desired value is not predetermined in this case, but it is additionally adjusted in a superimposed control loop. The amplitude modulation, lying on the sense voltage, and caused directly by oscillations of the traveling wave motor 10 in the vicinity of the response point is demodulated, rectified and compared with a predetermined desired value for amplitude modulation. The comparative difference is fed to a controller, whose signal, taken at the output of the control signal, now represents the proportional desired value of the desired frequency. The desired value of the amplitude is thus determined as a function of the elasticity of the friction layer present in the traveling wave motor 10 and the force of pressure between the rotor 12 and stator 11.

This frequency control method is implemented by the control device illustrated in FIG. 1. In this case, the excitation alternating voltage of the traveling wave motor 10 is supplied by a voltage controlled oscillator 13, whose oscillator frequency is adjustable by means of a d-c control voltage lying at its control input. A first controller 14 is connected to the control input of the oscillator 13. This controller 14 is configured here as a PT1 controller, but may also exhibit other suitable control behavior. A first difference former 15 is connected to the input of the first controller 14. At the inverted input of this difference former 15 lies the peak rectifying value of the sense voltage taken from the piezoring. This peak rectifying value is obtained from the sense voltage by means of a peak rectifier 16. At the non-inverted input of the difference former 15 also lies a direct voltage which is supplied by the superimposed control loop, which in its entirety is denoted by reference numeral 17. This control loop 17 comprises an amplitude demodulator 18 to which amplitude modulated sense voltage is supplied, a rectifier stage 19, which is connected to the output of the amplitude demodulator 18 and which supplies a direct voltage proportional to the modulation stroke of the sense voltage, a second difference former 20, and a controller 21 which is connected to the output of the difference former 20, and a second controller 21, whose output is connected to the non-inverted input of the first difference former 15. The output voltage of the rectifier stage 19 in this case is supplied to the inverting input of the second difference former 20, while at its non-inverting input lies the desired amplitude modulation value. The second controller 21 is configured here as a PI controller, but it may also exhibit another suitable control behavior. The adjustment value of the second controller 21 is the desired value for the base control loop. Due to the superimposed frequency control loop 17, the desired value of the basic control loop is also controlled now and is not kept rigid. Despite the most varying influence values and their drifts, the traveling wave motor 10 is thus constantly adjusted to the operating point of maximal performance.

We claim:

1. Method for controlling the frequency of a traveling wave motor having a disk-shaped stator and a piezoring fastened to the stator and a disk-shaped rotor which is pressed to contact the piezoring by means of a frictional layer, with the piezoring carrying two groups of mutually alternating piezoelectric zones, said method comprising: exciting the groups of mutually alternating piezoelectric zones by alternating voltages which are phase-shifted by 90° in relation to one another, obtaining an actual value proportional to the actual frequency of the motor from the amplitude of an alternating sense voltage tapped from a stator of the traveling wave motor, deriving a desired value proportional to the desired frequency of the motor from the amplitude modulation of the sense voltage, comparing the desired value with the actual value to provide a deviation value, using the deviation value to correct the frequency of the excitation alternating voltage by applying the deviation value, after being subjected to a suitable control algorithm, to the basic control circuit of the traveling wave motor to cause the motor to operate in the range of its maximum output.

2. Method according to claim 1, wherein, to carry out the step of deriving the desired value, the amplitude modulated sense voltage is demodulated, rectified and compared with a predetermined desired amplitude modulation value, and that the comparative difference is fed to a controller whose control signal, which was taken at the output, is used as the desired value.

3. Method according to claim 2, wherein the desired amplitude modulation value is determined as a function of the elasticity of the frictional layer between the stator and the rotor and by the force of the contact pressure between the two.

4. Control device for implementing the control method according to claim 2, comprising: a voltage-controlled oscillator supplying the excitation voltage for the traveling wave motor, with the oscillator frequency being adjustable by means of a direct control voltage lying at the control input of said oscillator; a first controller for supplying the desired direct control voltage to said oscillator, with the first controller having an output which is connected to the control input of the oscillator, and an input to which is supplied the deviation obtained from the comparison of the actual direct voltage and the desired direct voltage derived from the amplitude of the sense voltage in a first difference former; an amplitude demodulator which is supplied with the sense voltage; a rectifier stage connected to the output of the amplitude demodulator for supplying a direct voltage output proportional to the modulation stroke; a second difference former which, on the one side, is supplied with the differential direct voltage output the rectifier stage, and, on the other side, is supplied with the predetermined voltage corresponding to the desired amplitude modulation value, and whose output voltage is fed to the input of a second controller, with the output signal of the second controller corresponding to the desired direct voltage supplied to the first difference former.

5. Control device according to claim 4, wherein that the second controller is a PI controller.

6. Control device according to claim 4, wherein that the first controller is a PT1 controller.

7. Control device according to claim 5, wherein that the first controller is a PT1 controller.

8. Control device for implementing the control method according to claim 3, comprising: a voltage-controlled oscillator supplying the excitation voltage for the traveling wave motor, with the oscillator frequency being adjustable by means of a direct control voltage lying at the control input of said oscillator; first controller for supplying the desired direct control voltage to said oscillator, with the first controller having an output which is connected to the control input of the oscillator, and an input to which is supplied the deviation obtained from the comparison of the actual direct voltage and the desired direct voltage derived from the amplitude of the sense voltage in a first difference former; an amplitude demodulator which is supplied with the sense voltage; a rectifier stage connected to the output of the amplitude demodulator for supplying a direct voltage output proportional to the modulation stroke; a second difference former which, on the one side, is supplied with the differential direct voltage output the rectifier stage, and, on the other side, is supplied with the predetermined voltage corresponding to the desired amplitude modulation value, and whose output voltage is fed to the input of a second controller, with the output signal of the second controller corresponding to the desired direct voltage supplied to the first difference former.

9. Control devise according to claim 8, wherein the second controller is a PI controller.

10. Control device according to claim 8, wherein the first controller is a PT1 controller.

11. Control device according to claim 9, wherein the first controller is a PT1 controller.

\* \* \* \* \*